(12) United States Patent
Zaiki et al.

(10) Patent No.: US 6,292,866 B1
(45) Date of Patent: Sep. 18, 2001

(54) PROCESSOR

(75) Inventors: Koji Zaiki; Takao Yamamoto, both of Osakafu (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/280,711

(22) Filed: Mar. 30, 1999

(30) Foreign Application Priority Data

Apr. 24, 1998 (JP) .................................................. 10-115522

(51) Int. Cl.$^7$ ............................ G06F 13/24; G06F 13/28
(52) U.S. Cl. ..................... 710/264; 710/268; 710/263; 710/48; 711/153
(58) Field of Search .................................. 711/115, 153, 711/117, 220, 152; 710/10, 261, 263, 266, 267, 264, 268, 262, 48; 712/470.02, 30, 1, 23, 25, 29

(56) References Cited

U.S. PATENT DOCUMENTS 4,100,865 * 7/1978 Landau, Jr. et al. ............. 712/470.02
5,214,771 * 5/1993 Clara et al. ............................. 710/10

FOREIGN PATENT DOCUMENTS 0 511 769 A 11/1992 (EP) .
01229332A 9/1989 (JP) .

OTHER PUBLICATIONS

Patent Abstracts of Japan, vol. 010, No. 361 (p. 523), Interupt Source Analyzing Device, 61157948,Jul. 17, 1986.
Patent Abstracts of Japan, vol. 017, No. 707 (p. 1667) Programmable Controller, 65241853, Sep. 21, 1993.
Patent Abstracts of Japan, vol. 017, No. 363 (p. 1570) Interrupt Control Circuit, 05053830, Mar. 5, 1993.

* cited by examiner

*Primary Examiner*—Daniel H. Pan
(74) *Attorney, Agent, or Firm*—Wenderoth, Lind & Ponack, L.L.P.

(57) ABSTRACT

A processor for controlling execution of instructions stored in a main storage and interruption processing, comprises: interruption processing control device operable to accept an interruption request, analyze an accepted interruption to obtain a cause of the interruption, and generate information indicating a storage position in the main storage of a procedure for processing the cause of the interruption; specific address holding device operable to hold first address information obtained from the information generated by the interruption processing control device; and instruction execution control device operable to decide whether or not the first address information held by the specific address holding device is to be used as information indicating a storage position of an instruction to be executed and control instruction execution according to a decision result.

16 Claims, 9 Drawing Sheets

PROCESSOR

FIELD OF THE INVENTION

The present invention relates to a processor and, more particularly to a processor which is capable of controlling execution of instructions stored in a main storage and capable of performing interruption (interrupt) processing.

BACKGROUND OF THE INVENTION

Currently, most computers adopt Neumann type architecture in which a program is stored in a storage similar to ordinary data, and the program is read from the storage and is executed. Generally, a Neumann type computer is realized as a computer system which includes a computer comprising a processor such as a CPU (Central Processing Unit) for controlling execution of the program and a main storage for temporarily storing the program or the data, I/O (input/output) devices for performing I/O operation, an auxiliary (secondary) storage for storing the program or the data for a long period of time, and the like.

When the program is executed under control of the processor, an instruction such as "operation" or "transfer" contained in the program is read from the main storage, and instruction processing such as operation or transmission of a control signal for directing each part of the computer to perform a transfer process or the like according to the instruction is carried out. The processor includes a program counter for specifying areas in the main storage where instructions to be executed are stored, an instruction register for storing the instructions, and the like. In principle, the processor sequentially reads the instructions and performs instruction processing.

As an example of a technique employed in the processor to realize high-speed processing, there is "pipeline processing". As described above, basically, the instructions are sequentially read and executed. In the processor, processing is performed in plural stages, including instruction fetch, instruction decoding, instruction execution, outputting operation results, and the like. In the pipeline processing, processing in each stage is carried out in parallel to realize high-speed processing. In sequential processing, until an instruction is subjected to processing in plural stages, processing of a subsequent instruction cannot be started, whereas in the pipeline processing, processing of the subsequent instruction starts without waiting for a completion of the processing of the instructions, which enables high-speed processing. For this reason, most processors recently used adopt pipeline processing.

To be more detailed, in the pipeline processing, an instruction is fetched, and then a subsequent instruction is fetched while performing processing for the fetched instruction in subsequent stages, which processing is called a "prefetch process". Hence, the processor has a storage area for the instruction under execution and a storage area for the instruction to be prefetched. The instruction to be prefetched is basically determined according to the order of the instructions contained in the program. When the instructions are sequentially prefetched, there is a possibility that the pipeline processing cannot be performed appropriately when "jump" or "branch" is included in the program. In order to perform the prefetch process appropriately, a branch prediction method has been developed.

By the way, various interruptions often occur in the computer system. One important role of the processor is to control processing for these interruptions. The interruption occurs when a request is issued from the peripheral device such as the I/O device or when incorrect processing is performed during execution of the program, and demands that it should be processed with priority even if a specified program is being executed. When the interruption occurs, the processing (program) under execution is interrupted and another processing responding to the interruption is performed. This is called interruption processing.

When a timer or an external device issues an interruption request signal to the processor or when an interruption request is issued during execution of the program, the processor temporarily saves the program under execution and then executes a processing program in response to the interruption request signal. Upon completion of interruption processing, the processor resumes execution of the program from when it was interrupted.

FIG. 7 is a control (execution) flow diagram for explaining control for the interruption processing performed by a general processor according to a prior art. The same figure shows storage state of the main storage which has areas 701–703. The area 701 contains a procedure (program) for interruption processing, the area 702 contains a procedure for performing processing for a specified cause of the interruption, and the area 703 contains a general program such as an application program. The procedure stored in the area 701 includes analyzing the cause of the interruption. The storage area in the main storage are uniquely specified by addresses.

The same figure also shows how the general processor according to the prior art performs control when the interruption occurs while an instruction is contained in the general program is processed. In this case, the processor carries out the procedure for interruption processing in a specified area in the main storage to analyze the cause of the interruption, and then it performs processing for the cause of the interruption.

As shown in FIG. 7, when the interruption occurs while the instruction 1a stored in an area specified by an address n is executed, in control flow P701, the processor executes an instruction 2a stored in an area specified by an address AAAA indicating the head of the area 701. Then, in control flow P702a, the processor executes an instruction 2b, and then sequentially executes the following instructions. As a result of this, the processor analyzes the cause of the interruption at the point of an instruction 2k, and thereby obtains a starting address of an area which contains the procedure for performing processing for the cause of the interruption. In this case, this procedure is stored in an area starting at an address XXXX. In control flow P702b, the processor executes an instruction 3a stored in the area located at the address XXXX, and sequentially executes the following instructions.

FIG. 8 is a timing chart showing the state of the prior art processor which performs such processing. In the figure, there are shown instruction addresses indicating where instructions to be executed are stored and instructions under execution at respective timings.

At timing t0, the address n indicating the storage area for the instruction 1a is obtained as the instruction address and the instruction 1a is executed. When "occurrence of the interruption" is sent to the processor at this point of time, at timing t1, the address AAAA indicating the storage area for the instruction 2a, i.e., the instruction at the head of the procedure for interruption processing is obtained as the instruction address and the instruction 2a is executed. At timing t2, the instruction 2b subsequent to the instruction 2a is executed. The following instructions are sequentially executed and then at timing tk, the cause of the interruption is analyzed, and thereby the address at the head of the procedure for performing processing for the cause of the interruption is obtained. At timing tk+1, the instruction address XXXX is obtained and thereby the instruction 3*a* at the head of the procedure for performing processing for the cause of the interruption is executed.

In some cases, the computer system is extended by increasing peripheral devices or adding application programs. The extension of the system often results in an increased number of causes of the interruption. When the interruption occurs, the prior art general processor carries out the procedure for interruption processing which is stored in a fixed storage area to analyze the cause of the interruption, and then performs processing for the cause of the interruption. Therefore, if the causes of the interruption increase, they can be handled flexibly by adding the procedure for analyzing them and the procedure for performing processing for them.

However, the general processor always fetches and executes the instructions in the fixed procedure to analyze the cause of the interruption before it preforms processing for the cause of the interruption. The analysis process generally requires several steps, and thereby the interruption cannot be handled quickly. As a solution to this, some of the prior art processors perform interruption processing in the following way to realize high-speed processing.

FIG. 9 is a diagram for explaining a processor which performs high-speed processing according to the prior art, and showing an example of the above processors based on a manual of a microcontroller SH-3 manufactured by Hitachi Co. Turning to FIG. 9, the processor comprises a vector base register 901, an event register 902, and a main storage 903 which contains procedures for performing processing for respective causes of interruption. The vector base register 901 holds a vector base indicating a reference address. The event register 902 holds a cause of interruption when an interruption occurs. The main storage 903 contains interruption processing 1 for an "interruption cause 1", interruption processing 2 for an "interruption cause 2", . . .

In the prior art processor which performs high-speed processing, the procedure for each interruption processing is stored in an area starting at an address (address indicating a starting position of an area) calculated from a reference address and an offset value. To be specific, the procedure for interruption processing 1 is stored in an area starting at an address obtained by adding the reference address (base) and an offset value 1 (offset 1), and the procedure for interruption processing 2 is stored in an area starting at an address obtained by adding the reference address (base) and an offset value 2 (offset 2).

As the offset value, a vector offset value obtained by hardware as a result of an occurrence of the interruption is used. For instance, in a system which caches a set of a logical address and a physical address by the use of a translation look-aside buffer (TLB) which realizes a high-speed virtual storage management mechanism, when it is not hit in a cache, "0x00000400" indicating a TLB mistake is obtained. The address obtained by adding the value obtained as the offset value to the reference address (base) is used as the starting address, to perform the procedure for performing processing for the cache mistake.

When the interruption occurs in the above processor, the cause of the interruption obtained by hardware is stored in the event register 902. The processor adds the base value indicating the reference address held by the vector base register 901 to the vector offset value obtained from the interruption cause which is held by the event register 902, to obtain the starting address of interruption processing. Then, one of the interruption processing 1, 2, . . . for the cause of the interruption is performed.

SUMMARY OF THE INVENTION

It is an object of the present invention to provide a processor which is compatible with a prior art general processor and is capable of performing high-speed interruption processing while adapting itself to system extension flexibly.

Other objects and advantages of the invention will become apparent from the detailed description that follows. The detailed description and specific embodiments described are provided only for illustration since various additions and modification within the spirit and scope of the invention will be apparent to those skill in the art from the detailed description.

According to a first aspect of the present invention, a processor for controlling execution of instructions stored in a main storage and interruption processing, comprises: interruption processing control means which accepts an interruption request, analyzes and accepted interruption to obtain a cause of the interruption, and generates information indicating a storage position in the main storage of a procedure for processing the cause of the interruption; specific address holding means which holds first address information obtained from the information generated by the interruption processing control means; and instruction execution control means which decides whether or not the first address information held by the specific address holding means is to be used as information indicating a storage position of an instruction to be executed and controls execution of the instruction according to a decision result. Thereby, according to the decision by the instruction execution control means and by the use of the first address information held by the specific address holding means, the procedure for performing processing for the cause of the interruption is carried out quickly.

According to a second aspect of the present invention, in the processor of the first aspect, the interruption processing control means outputs information indicating the interruption request to the instruction execution control means, and the instruction execution control means, when it receives the information indicating the interruption request, generates information indicating a storage position in the main storage of a predetermined procedure and controls execution of the instruction so that the generated information is used as information indicating the storage position of the instruction to be executed. Thereby, the predetermined procedure can be carried out.

According to a third aspect of the present invention, the processor of the first or second aspect further comprises: means for holding storage position information of a subsequent instruction which generates information indicating a storage position in the main storage of an instruction to be subsequently executed and holds the generated information as second address information, wherein the instruction execution controls means controls execution of the instruction so that either the first address information or the second address information is used as the information indicating the storage position of the instruction to be executed. Thereby, the subsequent instruction can be executed.

According to a fourth aspect of the present invention, in the processor of the first aspect, the interruption processing control means includes means for holding storage position information of procedures, which holds information indicating correspondences between the causes of interruption obtained by analysis and the storage positions in the main storage of the procedures for processing the respective causes of interruption. Thereby, the storage position information is generated from the information held by the means for holding the storage position information of procedures.

According to a fifth aspect of the present invention, in the processor of the fourth aspect, the information held by the means for holding storage position information of procedures can be set by a user. Thereby, according to setting made by the user, the storage position information is generated.

According to a sixth aspect of the present invention, in the processor of the first aspect, the specific address holding means includes reference address information holding means for holding reference address information which specifies the storage position in the main storage. Thereby, the storage position information is generated by addition with the use of the reference address information.

According to a seventh aspect of the present invention, in the processor of the sixth aspect, the specific address holding means adds the information generated by the interruption processing control means to the reference address information to generate the first address information. Thereby, the storage position information is generated by addition with the use of the reference address information.

According to an eighth aspect of the present invention, in the processor of the sixth or seventh aspect, the information held by the reference address information holding means can be set by a user. Thereby, according to setting made by the user, the storage position information is generated.

DETAILED DESCRIPTION OF THE PREFERRED EMBODIMENTS

Embodiment 1

A processor according to a first embodiment of the present invention is adapted to hold an entry address of interruption processing, thereby realizing high-speed processing.

Figure 1:
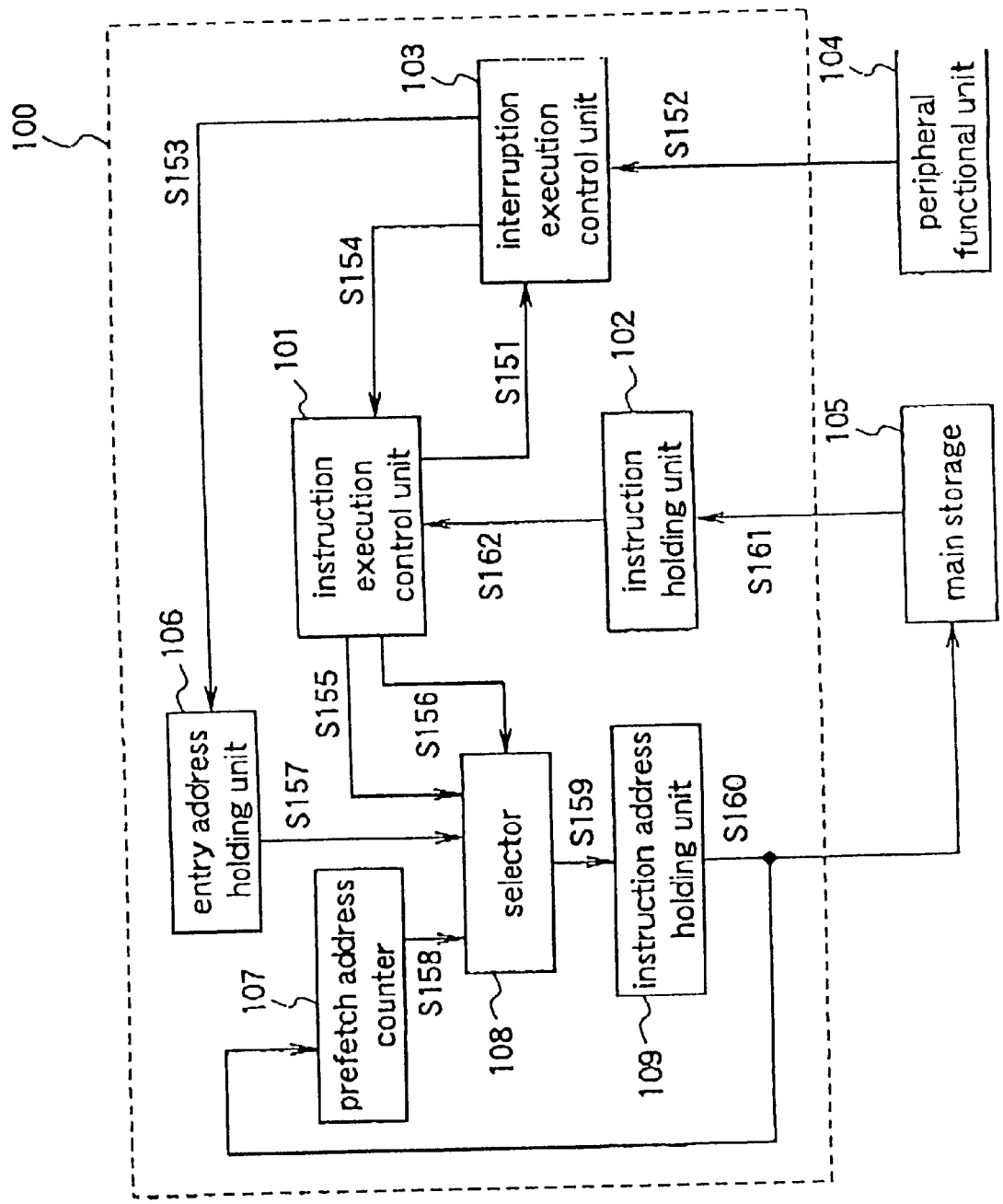
FIG. 1 is a block diagram showing a processor according to a first embodiment of the present invention.

FIG. 1 is a block diagram showing the processor according to the first embodiment of the present invention. Turning now to FIG. 1, a processor 100 of the first embodiment comprises an instruction execution control unit 101, an instruction holding unit 102, an interruption execution control unit 103, an entry address holding unit 106, a prefetch address counter 107, a selector 108, and an instruction address holding unit 109, and is connected to a peripheral functional unit 104 which communicates with peripheral devices and a main storage 105 for storing programs or data. In this illustrated example, an instruction executing unit, a register used in execution of instructions, and the like are omitted.

The instruction execution control unit 101 interprets (decodes) the instruction held by the instruction holding unit 102, and executes the instruction, that is, controls operation or information transfer. Also, when the interruption occurs, according to the interpretation (decoding) result of the instruction held by the instruction holding unit 102, the control unit 101 decides whether or not an address held by the entry address holding unit 106 mentioned later is to be used.

In other words, the instruction execution control unit 101 functions as instruction execution control means which decides whether or not first address information (entry address) held by specific address holding means (entry address holding unit 106) is information indicating the storage position of the instruction to be executed.

The instruction holding unit 102 fetches an instruction to be executed from the main storage 105 and holds the instruction while it is executed in accordance with control of the instruction execution control unit 101. When the interruption execution control unit 103 receives a signal for sending "occurrence of interruption" from the peripheral functional unit 104 or the instruction execution control unit 101, it generates a signal for controlling interruption processing, and outputs the signal to the instruction execution control unit 101 and the entry address holding unit 106.

In other words, the interruption execution control unit 103 functions as means for controlling interruption processing which accepts an interruption request, analyzes the accepted interruption to obtain a cause of the interruption, and generates information indicating a position of an area in the main storage where a procedure for performing processing for the cause of the interruption is stored.

The peripheral functional unit 104 controls information exchange between peripheral devices (not shown) such as input/output devices or an external storage and the processor 100. The main storage 105 is realized by the use of a high-speed storage such as a semiconductor memory and stores instructions contained in the program and data to be processed.

The entry address holding unit 106 holds information output from the interruption execution control unit 103 as the entry address. The prefetch address counter 107 holds a prefetch address indicating a position of an area in the main storage 105 where an instruction to be prefetched is stored. The selector 108 selects one of the addresses supplied by the instruction execution control unit 101, the entry address holding unit 106, and the prefetch address counter 107 under control of the instruction execution control unit 101 and outputs the selected address to the instruction address holding unit 109. The instruction address holding unit 109 holds the address output from the selector 108 as an address of the instruction to be executed, and outputs a signal indicating the address to the main storage 105, which outputs the instruction stored in the area specified by the address to the instruction holding unit 102.

In other words, the entry address holding unit 106 functions as means for holding a specific address which holds information generated by the interruption execution control unit 103 and output from the same as first address information (entry address). The prefetch address counter 107 functions as means for holding subsequent storage position information which holds information indicating the position of the area in the main storage where an instruction to be subsequently executed is stored as second address information (prefetch address).

Figure 2:
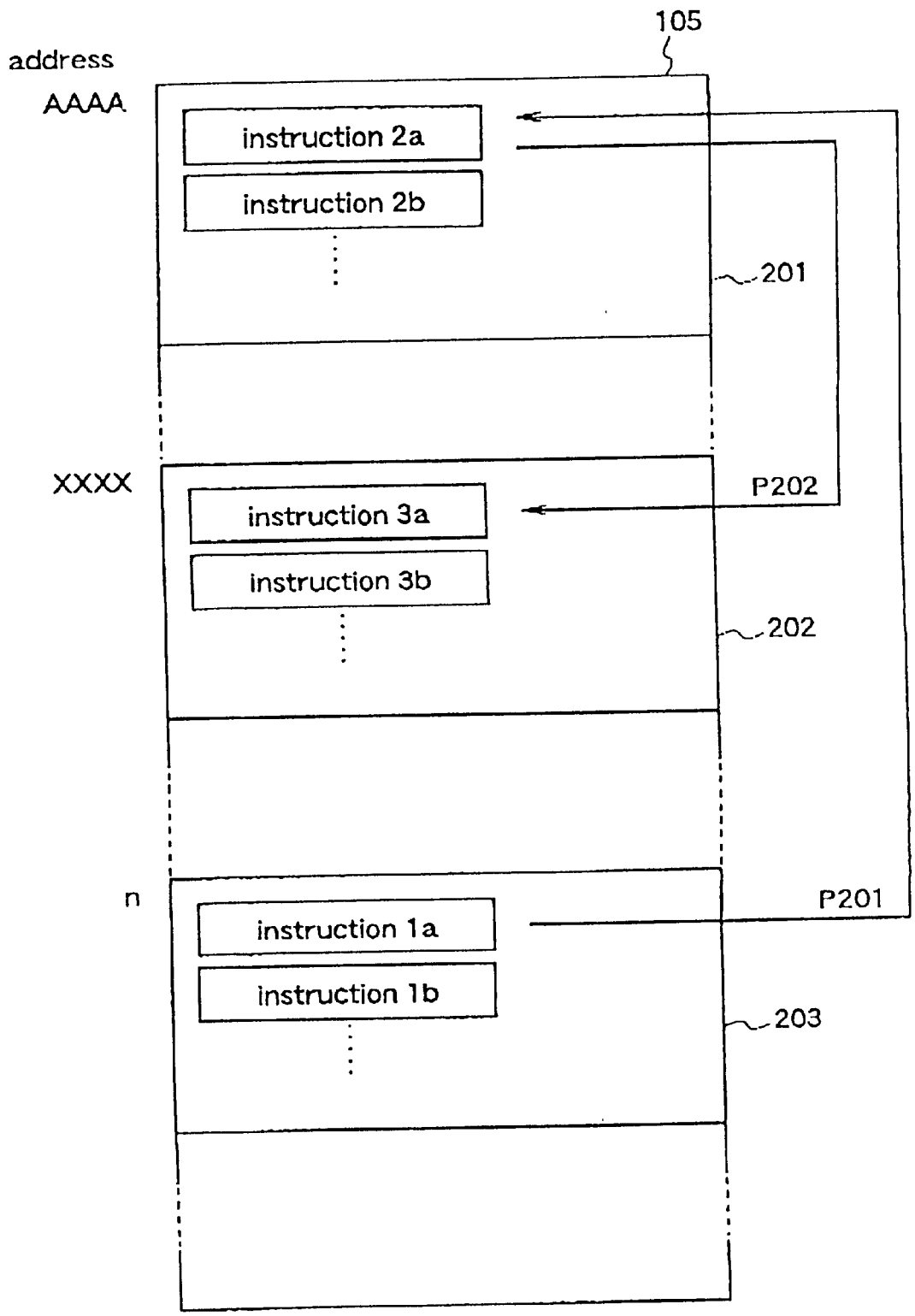
FIG. 2 is a flow diagram for explaining a procedure for interruption processing performed by the processor of the first embodiment.
Figure 3:
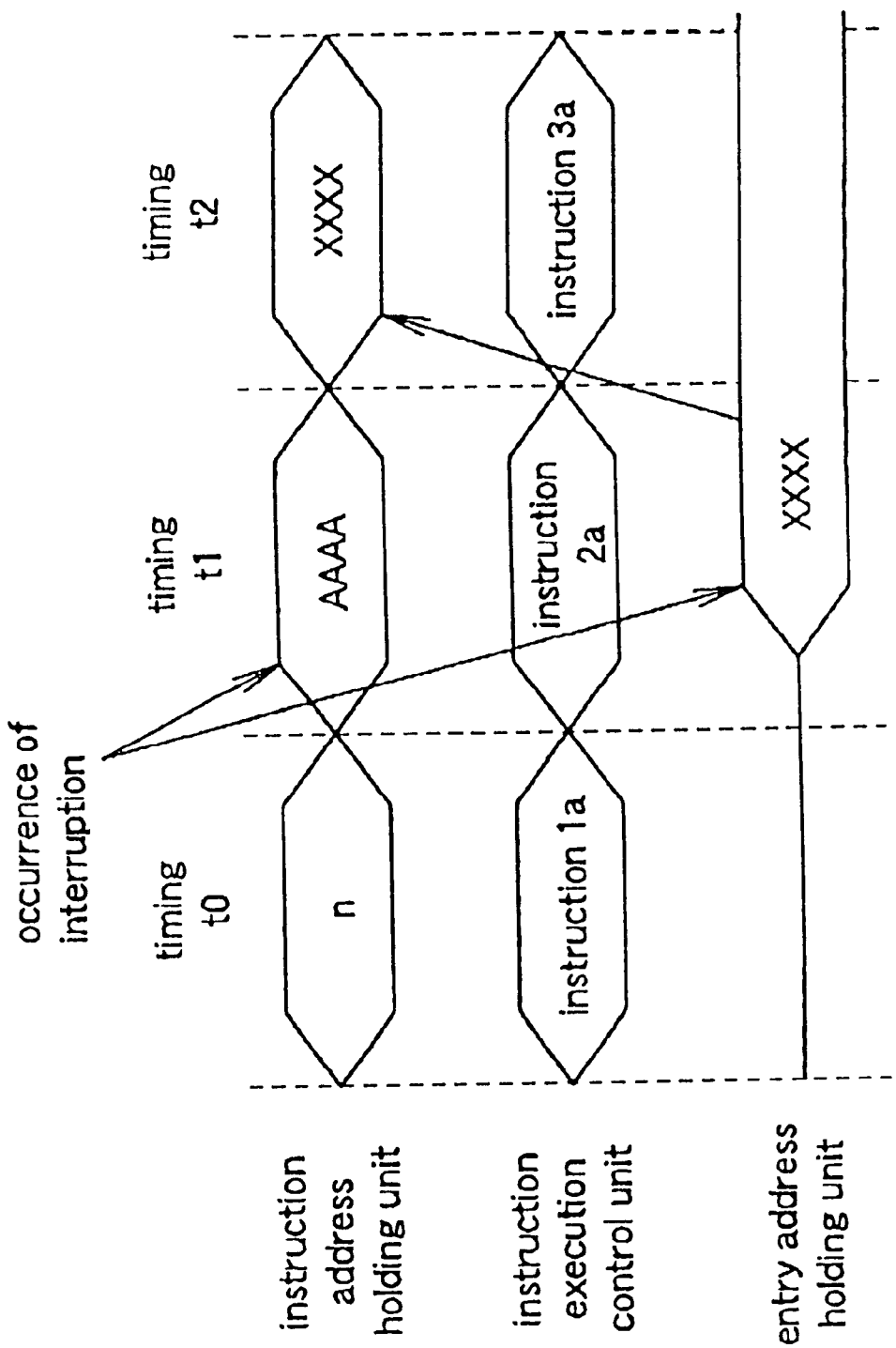
FIG. 3 is a timing chart showing the state of the interruption processing performed by the processor of the first embodiment.

FIG. 2 is a diagram showing a storage state of instructions and the procedure for interruption processing under control of the processor 100. In FIG. 2, a procedure for analyzing the interruption, a procedure for performing processing for a specified cause of the interruption, and a general program such as an application program are stored in areas 201, 202, and 203 in the main storage unit 105, respectively. These storage areas are uniquely specified by addresses. Instructions 2*a*, 3*a*, and 1*a* are stored in the uppermost portions of the areas 201, 202, and 203 specified by addresses AAAA, XXXX, and n, respectively. FIG. 3 is a timing chart showing the state of the processor 100 when it performs interruption processing.

Hereinafter, a description will be given of execution of the instructions stored in the main storage 105 which is performed by the processor 100 constructed as shown in FIG. 1. Two cases, i.e., "A. No interruption" and "B. Occurrence of Interruption" will be discussed.

A. No Interruption

When the general program stored in the area 203 in the main storage 105 shown in FIG. 2 is executed, the first instruction 1*a* is executed. Turning to FIG. 1 again, in order to start program execution, the instruction execution control unit 101 outputs a signal S155 and a selection direction signal S156 to the selector 108. The signal S155 indicates a first instruction address and the selection direction signal S156 is used for directing the selector 108 to select the signal S155. According to the selection direction signal S156, the selector 108 outputs a selection address signal S159 based on the signal S155 to the instruction address holding unit 109. In this case, the address signal S159 indicates the address "n" for specifying the storage area shown in FIG. 2 where the instruction 1*a* is stored.

The instruction address holding unit 109 outputs an address direction signal S160 indicating the address "n" to the main storage 105, which outputs the instruction 1*a* stored in the area specified by the address "n" to the instruction holding unit 102. The address direction signal S160 is also output to the prefetch address counter 107. The prefetch address counter 107 generates the prefetch address for specifying the area where the instruction to be prefetched is stored, according to the address indicated by the address direction signal S160, and outputs a prefetch address signal S158 indicating the prefetch address to the selector 108. The prefetch address counter 107 adds the address indicated by the address direction signal S160 to a predetermined value to generate the address for specifying the area where the subsequent instruction is stored, without the use of the branch prediction method and the like. The prefetch address counter 107 outputs the prefetch address signal S158 indicating the address for specifying the storage area of the instruction 1*b* shown in FIG. 2, to the selector 108.

The instruction holding unit 102 holds the instruction 1*a* stored in the area located at the address n of the main storage 105. The instruction execution control unit 101 analyzes the instruction 1*a* held by the instruction holding unit 102 and controls execution of the instruction 1*a*. When the instruction 1*a* is executed smoothly and no interruption occurs, the instruction execution control unit 101 outputs the selection direction signal S156 for directing the selector 108 to select the prefetch address signal S158 output from the prefetch address counter 107.

According to the selection direction signal S156, the selector 108 outputs the selection address signal S159 indicating the address of the instruction 1*b* to be prefetched, to the instruction address holding unit 109. In this case, the address signal S159 indicates the address for specifying the area where the instruction 1*b* is stored. Controlled by the processor 100, the subsequent instruction 1*b* is prefetched while the instruction 1*a* is executed.

B. Occurrence of Interruption

As mentioned previously, interruptions occur because of various factors. There are two sorts of interruptions, i.e., an interruption originating in the outside of the processor and an interruption originating in the inside of the processor. The interruption originating in the outside of the processor, namely, the peripheral devices, is the interruption which occurs when there is some specification by the user with the use of a mouse or keyboard, or when there is some direction about information transmission from the external storage, communication equipment, a network, and the like. This interruption is accepted by the peripheral functional unit 104 for supervising and controlling the peripheral devices, which generates an interruption signal S152 and outputs the same to the interruption execution control unit 103 included in the processor 100. Receiving the signal S152, the control unit 103 performs interruption processing.

On the other hand, the interruption originating in the inside of the processor is the interruption which occurs when an instruction for inappropriate operation is given or when an instruction for writing onto an incorrect address of the main memory is given or executed. This interruption which would occur in the instruction executing unit (not shown) is supervised by the instruction execution control unit 101. When the control unit 101 detects the interruption, it outputs an interruption signal S151 to the interruption execution control unit 103. Receiving the signal S151, the control unit 103 performs interruption processing.

The interruption execution control unit 103 has a capability of analyzing the cause of the interruption and a capability of specifying the storage position of the procedure for performing processing for the cause of the interruption. When the interruption signal S151 or S152 is input to the interruption execution control unit 103 from the instruction execution control unit 101 or the peripheral functional unit 104, respectively, it analyzes the signal to specify the cause of the interruption and generates a signal indicating the position of the area where the procedure for performing processing for the cause of the interruption is stored. The control unit 103 generates a signal S154 indicating the cause of the interruption and outputs the same to the instruction execution control unit, and outputs an address signal S153 indicating the storage position of the procedure to the entry address holding unit 106. The entry address holding unit 106 holds the address indicated by the address signal S153 as the entry address and outputs an entry address signal S157 indicating the entry address to the selector 108.

When the instruction execution control unit 101 is supplied with the interruption signal S154, it generates the signal S155 indicating the address "AAAA" as the starting position of the procedure for analyzing the interruption and outputs the signal S155 to the selector 108, and directs the selector 108 to select the signal S155 by the use of the selection direction signal S156. Thereby, the selector 108 outputs the selection address signal S159 indicating the address "AAAA" to the instruction address holding unit 109.

The instruction address holding unit 109 outputs the address direction signal S160 to the main storage 105. According to the signal S160, the instruction 2a stored in the area specified by the address "AAAA" of the main storage 105 is held by the instruction holding unit 102. Also, as in the case where no interruption occurs, the prefetch address signal S158 indicating the area where the subsequent instruction 2b is stored is generated by the prefetch counter 107 and output to the selector 108.

The instruction execution control unit 101 decodes the instruction held by the instruction holding unit 102 and, according to the decoded instruction, it decides whether or not the entry address signal S157 output from the entry address holding unit 106 is used as the signal indicating the storage position of the instruction to be subsequently executed. The instruction execution control unit 101 generates the selection direction signal S156 according to the decision result and outputs the signal S156 to the selector 108. Thereby, the selector 108 selects either of the entry address signal S157 and the prefetch address signal S158.

A description will be given of "B-1. Operation with Use of Entry Address Signal", and "B-2. Operation without Use of Entry Address Signal". "B-1. Operation with use of Entry Address Signal"

The instruction execution control unit 101 outputs the selection direction signal S156 for directing the selector 108 to select the entry address signal S157, to the selector 108, which outputs the entry address signal S157 output from the entry address holding unit 106 to the instruction addressed holding unit 109 as the selection address signal S159. The procedure of such processing is described by means of the flow shown in FIG. 2 and the timing chart shown in FIG. 3.

At timing to (FIG. 3), the addressed "n" is held by the instruction address holding unit 102 (FIG. 1), and the interruption occurs while the instruction 1a (instruction contained in the general program) stored in the area specified by the address "n" of the main storage 105 (FIG. 2) is executed. The interruption is, as mentioned previously, either the interruption originating in the outside of the processor or the inside of the processor, although the same interruption processing is performed after the signal S151 or S152 is input to the interruption execution control unit 103.

The interruption execution control unit 103 outputs the signal S154 indicating "occurrence of the interruption" to the instruction execution control unit 101, which outputs the signal S155 to the selector 108. The signal S155 indicates the address as the starting position of the area where the procedure for analyzing the interruption is stored. As shown in FIG. 2, since the procedure is stored in the area 201 starting at the address AAAA, the signal S155 indicates the address "AAAA", and according to the signal S156, the selector 108 outputs the signal indicating the address "AAAA" to the instruction address holding unit 109, to be held therein.

The interruption execution control unit 103 outputs the address signal S153 to the entry address holding unit 106. Here it is assumed that the signal input to the control unit 103 is "0x 00000400" indicating a TLB mistake and the procedure for performing processing for the TLB mistake is stored in the area 202 (FIG. 2) of the main storage, the first instruction of which (instruction 3a) is stored in the area specified by the address "XXXX". The interruption execution control unit 103 outputs the signal S153 indicating the address "XXXX", which is held by the entry address holding unit 106 as the entry address.

The above-described operation is performed along the control flow P201 shown in FIG. 2, and the instruction to be executed changes from the instruction 1a stored in the area located at the address n which is being executed when the interruption occurs to the instruction 2a stored in the area located at the address AAAA. Also, as shown in FIG. 3, when the interruption occurs at timing t0, the instruction address holding unit 109 holds the address AAAA and the instruction execution control unit 101 executes the instruction 2a stored in the area located at the address AAAA of the main storage 105. At timing t1, the entry address holding unit 106 holds the address "XXXX" output from the interruption execution control unit 103 as the entry address.

Thereafter, according to the selection direction signal S156 from the instruction execution control unit 101, the selector 108 selects the entry address signal S157 an outputs the same to the instruction address holding unit 109. Therefore, at timing L2, the instruction address holding unit 109 holds the address XXXX, and the instruction execution control unit 101 executes the instruction 3a stored in the area located at the address XXXX. This operation is performed along the control flow P202 shown in FIG. 2, and the instruction to be executed changes from the instruction 2a stored in the area located at the address AAAA which is being executed to the instruction 3a stored in the area located at the address XXXX. After the timing t2, performed is the procedure for performing processing for the TLB mistake stored in the area 202 shown in FIG. 2. B-2. Operation without Use of Entry Address Signal.

Figure 7:
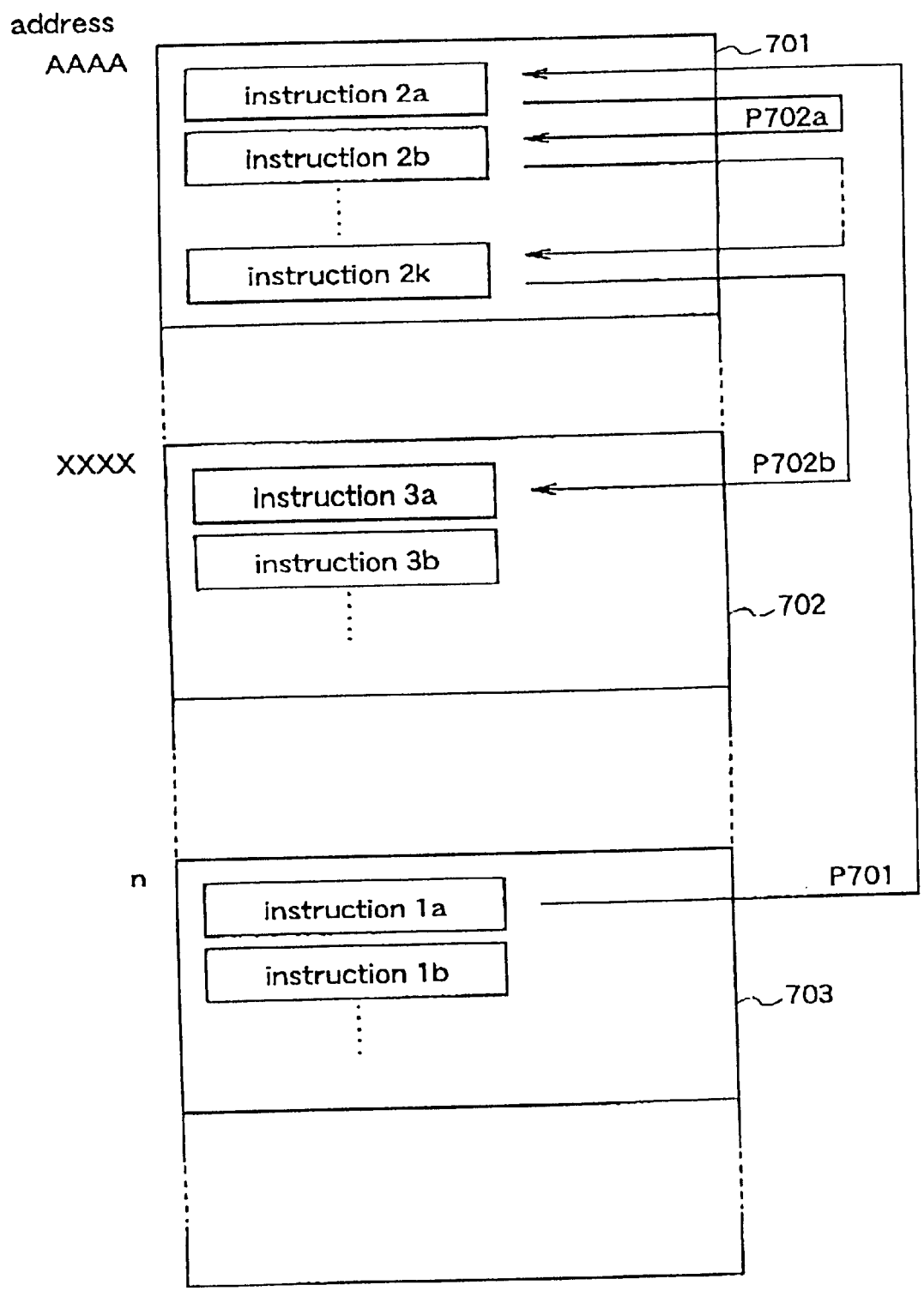
FIG. 7 is a flow diagram showing a procedure for interruption processing performed by a general processor according to a prior art.
Figure 8:
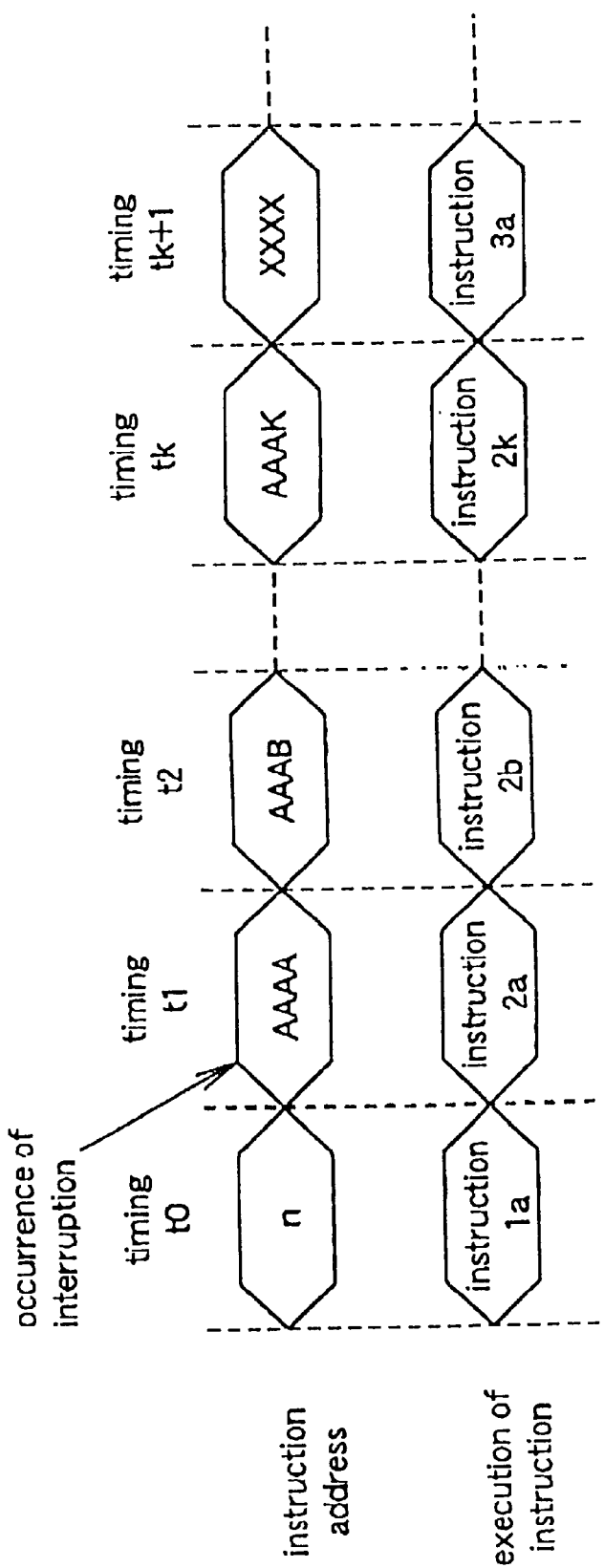
FIG. 8 is a timing chart showing interruption processing performed by the general processor according to the prior art.
Figure 9:
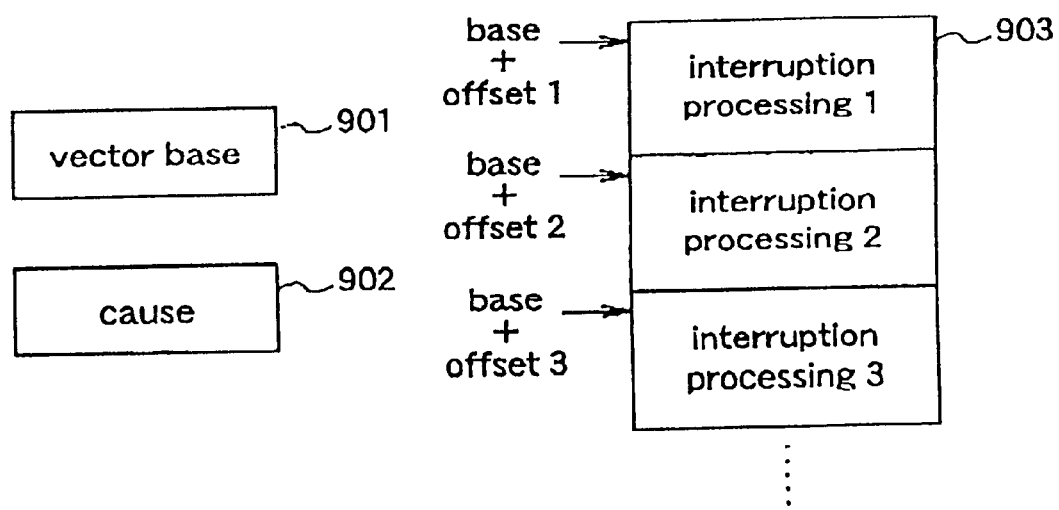
FIG. 9 is a diagram for explaining interruption processing performed by an improved processor according to a prior art.

The instruction execution control unit 101 outputs the selection direction signal S156 to the selector 108. According to the selection direction signal S156, the selector 108 selects the prefetch address signal S158. The selector 108 selects the prefetch address signal S158 output from the prefetch address counter 107 and outputs the address signal S159 to the instruction address holding unit 109. Since the prefetch address signal indicates the storage position of the instruction 2b is executed subsequently to execution of the instruction 2a. Therefore, the procedure for such processing is similar to that performed by the general processor according to the prior art (see FIGS. 7 and 8).

The selection direction signal S156 is output from the instruction execution control unit 101 according to the following decision. The instruction execution control unit 101 decides whether or not the instruction 2a held by the instruction holding unit 102 is a "jump" instruction. When it decides that the instruction 2a is the jump instruction, the control unit 101 outputs the selection direction signal S156 directing the selector 108 to select the entry address signal, or otherwise, the control unit 101 outputs the signal S156 directing the selector 108 to select the prefetch address signal rather than the entry address signal.

When the instruction 2a is the jump instruction, a branch address is held. In this case, therefore, branching to the address indicated by the entry address signal enables B-1 processing. Conversely, when the instruction 2a is not the jump instruction, the branch address is not stored or the branch address is stored but branching need not be performed (when there is only one cause for the interruption and one procedure for the cause of the interruption is carried out). In such cases, B-2 processing is carried out without the use of the entry address signal.

Thus, in accordance with the first embodiment, the processor 100 includes the instruction execution control unit 101, the interruption execution control unit 103, the entry address holding unit 106, and the selector 108, wherein, accepting the interruption, the interruption execution control unit 103 specifies the cause of the interruption and generates the signal indicating the area where the procedure for performing processing for the specified cause of the interruption is stored, the entry address holding unit 106 holds the address indicated by this signal as the entry address, and the selector 108 selects the entry address according to the direction of the instruction execution control unit 101, whereby the procedure for interruption processing can be carried out at a high speed. In addition, the procedure for interruption processing performed by the prior art general processor can be carried out according to the direction of the instruction execution control unit 101 and selection of the selector 108. As a result, the processor of the present invention may use the program developed for the general processor and can adapt itself to extension flexibly and easily like the general processor.

Embodiment 2

A processor according to a second embodiment of the present invention is adapted to hold an entry address like the first embodiment and has an entry address table which contains entry addresses.

Figure 4:
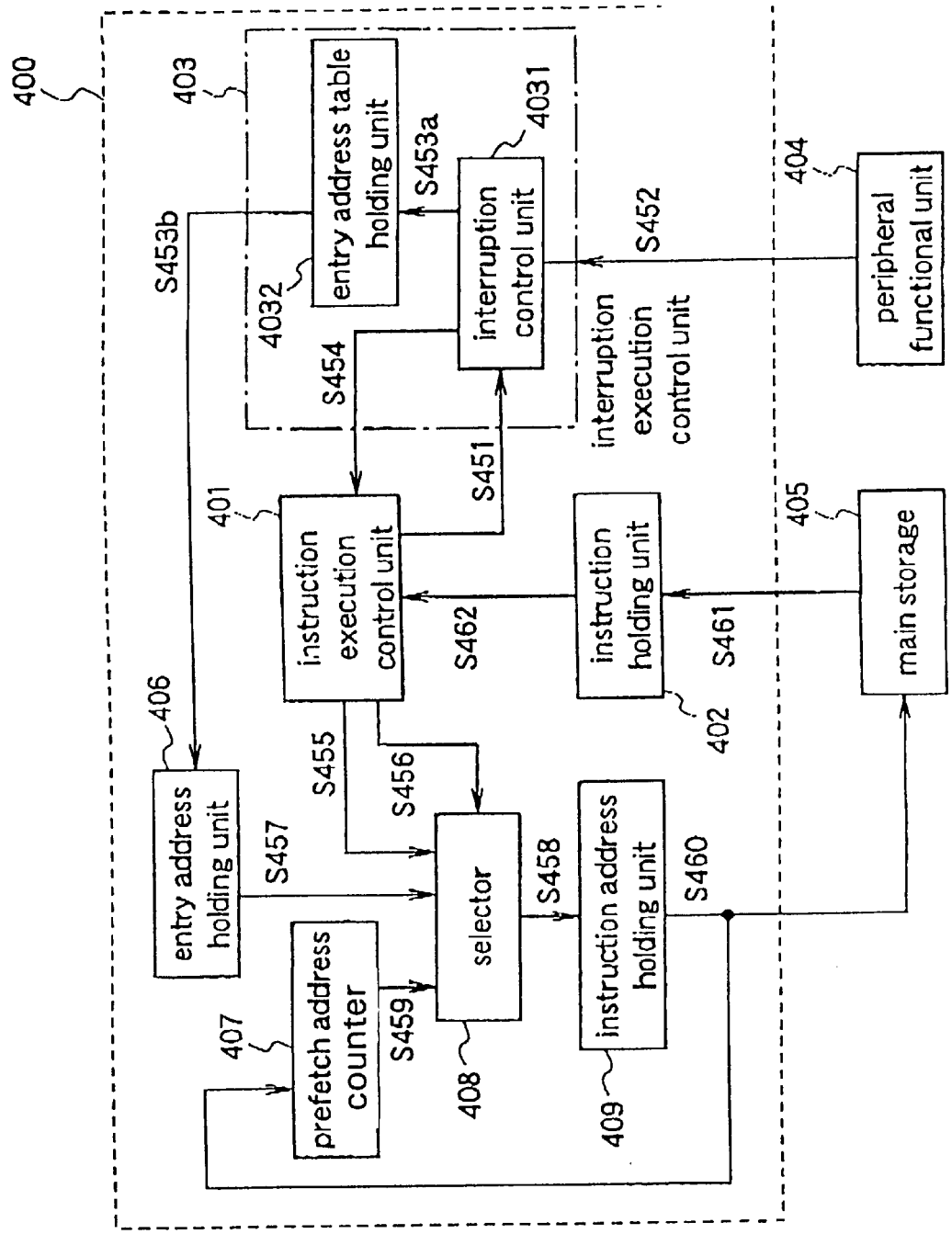
FIG. 4 is a block diagram showing a processor according to a second embodiment of the present invention.

FIG. 4 is a block diagram showing the construction of the processor of the second embodiment. Turning to FIG. 4, a process or 400 of the second embodiment comprises an instruction execution control unit 401, an instruction The interruption execution control until 403 comprises an interruption control unit 4031 and an entry address table holding unit 4032. The interruption control unit 4031 generates a signal for controlling interruption processing and outputs the signal to the instruction execution control unit 401 and the entry address table holding unit 4032, when it receives the signal indicting "occurrence of interruption" from the peripheral functional unit 404 or the instruction execution control unit 401. Receiving the signal from the interruption control unit 4031, the entry address table holding the unit 4032 obtains an entry address of the input signal with reference to the entry table included therein and outputs the entry address to the entry address holding unit 406. The entry address holding unit 406 holds the entry address output from the entry address table holding unit 4032.

In other words, the interruption execution control unit 403 which functions as means for controlling interruption process, includes the entry address table holding means 4032 which functions as means for holding storage position information of the procedure for performing processing for the cause of the interruption, which holds the area in the main storage where the procedure for performing processing for the cause of the interruption is stored (as the entry address table.)

The instruction execution control unit 401, the instruction holding unit 402, the peripheral functional unit 404, the main storage unit 405, the prefetch address counter 407, the selector 408, and the instruction address holding unit 409 are identical to the units 101, 102, 104, 105, 107, 108, and 109 of the first embodiment, respectively.

Figure 5:
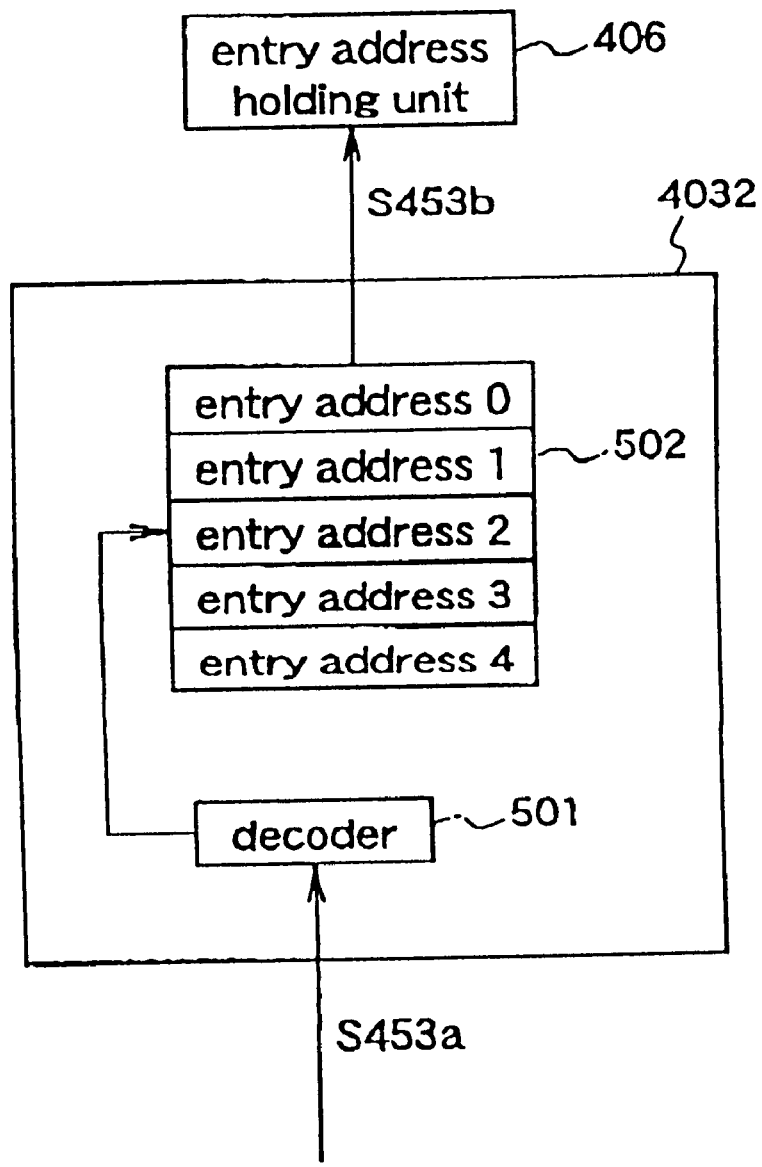
FIG. 5 is a block diagram showing an internal structure of an entry address table holding unit included in the processor of the second embodiment.

FIG. 5 is a block diagram showing an internal structure of the entry address table holding unit 4032. As shown in FIG. 5, the entry address table holding unit 4032 comprises a decoder 501 and an entry address table 502. The decoder 501 decodes the signal supplied by the interruption control unit 4031 to obtain an interruption request number. The entry address table holding unit 4032 finds an entry address of the interruption request number obtained by the decoder 501 with reference to the entry address table 502. The entry address table 502 contains entry addresses of areas which contain procedures for performing processing for causes of interruption indicated by respective interruption request numbers and can be set by the user.

Hereinafter, a description will be given of operation of the processor of the second embodiment so constructed. Operation performed by the processor when no interruption occurs is identical to operation in "A. No Interruption" of the first embodiment. On the other hand, when the interruption occurs, operation is performed as follows.

When an interruption originating in the peripheral devices occurs or an interruption originating in the inside of the processor occurs, the peripheral functional unit 404 or the instruction execution control unit 401 supplies a signal S452 or S451 indicating "occurrence of interruption", respectively, to the interruption execution control unit 403, the interruption control unit 4031 of which accepts the signal S451 or S452. The interruption control unit 4031 outputs a signal S454 indicating "interruption" to the instruction execution control unit 401 and a signal S453a indicating "interruption" to the entry address table holding unit 4032.

In the entry address table holding unit 4032 shown in FIG. 5, the decoder 501 receives the signal S453a, and decodes the same to obtain the interruption request number. Then, from the entry address holding table 502, the entry address of the interruption request number is read and a signal S453b indicating the entry address is output to the entry address holding unit 406.

Assume that "0x 00000400" indicating a TLB mistake is input to the decoder 501 as the signal S453a. The decoder 501 decodes the signal S453a to obtain a preset interruption request number "2". From the entry address table 502, the entry address "XXXX" of the interruption request number 2 is obtained. The signal S453b indicating the entry address "XXXX" is output to the entry address holding unit 406.

Like the first embodiment, storage state of the main storage 405 is as shown in FIG. 2. Instructions 3a, 3b . . . stored in the area 202 starting at the address "XXXX" are the procedure for performing processing for the TLB mistake. Operation or the entry address holding unit 406 after holding the entry address indicting "XXXX" is identical to that of the first embodiment. Specifically, the instruction 3a and the following instructions are executed, whereby interruption processing is carried out.

Thus, in accordance with the second embodiment, the processor 400 of the second embodiment includes the instruction execution control unit 401, the interruption execution control unit 403, the entry address holding unit 406, and the selector 408, whereby the processor realizes high-speed processing while maintaining compatibility with the general processor like the first embodiment. In addition, the interruption execution control unit 403 includes the entry address table holding unit 4032 including the entry address table which can be set by the user. As a result, the area where the procedure for performing processing for the cause of the interruption can be arbitrarily set and changed and thereby the system can be constructed flexibly.

Embodiment 3

A processor according to a third embodiment of the present invention is adapted to hold an entry address like the first embodiment and hold a base address for obtaining the entry address.

Figure 6:
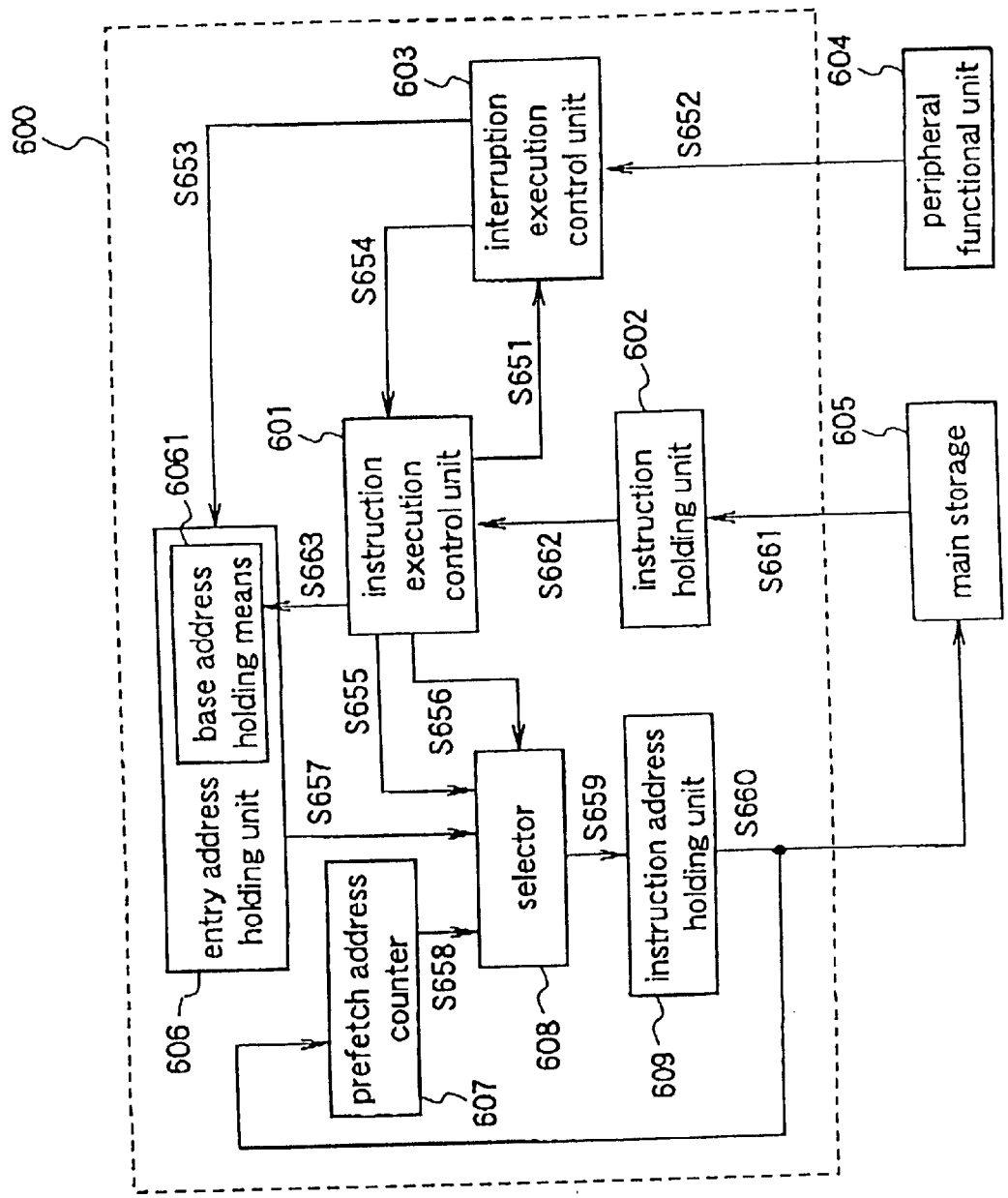
FIG. 6 is a block diagram showing a processor according to a third embodiment of the present invention.

FIG. 6 is a block diagram showing the processor of the third embodiment. Turning to FIG. 6, a processor 600 of the third embodiment comprises an instruction execution control unit 601, an instruction holding unit 602, an interruption execution control unit 603, an entry address holding unit 606, a prefetch address counter 607, a selector 603, and an instruction address holding until 609, and is connected to a peripheral functional unit 604 which communicates with peripheral devices and a main storage 605 for temporarily storing programs or data. In the processor of the third embodiment, the entry address holding unit 606 includes base address holding means 6061.

The base address holding means 6061 holds a base address which can be set by the user. The entry address holding unit 606 uses a signal output from the interruption execution control unit 603 and the base address held by the base address holding means 6061 to generate the entry address.

In other words, the entry address holding unit 606 which functions as specific address holding means includes the base address holding means 6061 which functions as reference address information holding means which holds reference address information (base address) used for specifying the storage position of the main storage.

The instruction execution control unit 601, the instruction holding unit 602, the interruption execution control unit 603, the peripheral functional unit 604, the main storage unit 605, the prefetch address counter 607, the selector 608, and the instruction address holding unit 609 are identical to the units 101, 102, 103, 104, 105, 107, 108, and 109 of the first embodiment, respectively.

Hereinafter, a description will be given of operation of the processor of the third embodiment so constructed. Operation performed by the processor when no interruption occurs is identical to operation in "A. No Interruption" of the first embodiment. On the other hand, when the interruption occurs, operation is performed as follows.

When an interruption originating in the peripheral devices occurs or an interruption originating in the inside of the processor occurs, the peripheral functional unit 604 or the instruction execution control unit 601 supplies a signal S652 or S651 indicating "occurrence of interruption", respectively, to the interruption execution control unit 603, which outputs a signal S654 indicating "interruption" to the instruction execution control unit 601 and an address signal S653 to the entry address holding unit 606.

The entry address holding unit 606 obtains a value indicating the base address held by the base address holding means 6061 according to a control signal S663 supplied by the instruction execution control unit 601. The entry address holding unit 606 adds the value indicating the obtained address to a value indicated by the address signal S653 and holds an addition result as the entry address.

Assuming that the address signal S653 indicates the address "XXXX" and the value indicating the base address is "0", the entry address obtained by addition is "XXXX", which is held by the entry address holding unit 606. Operation of the entry address holding unit 606 after holding the entry address is identical to that of the first embodiment. Specifically, the instruction 3*a* and the following instructions are executed, whereby interruption processing is carried out.

Also, assume that the procedure comprising the instruction 3*a* and the following instructions stored in the area 202 starting at the address "XXXX" shown in FIG. 2 is moved to another area of the main storage 105. If a value indicating difference between a starting address of another area and the starting address s"XXXX" of the area 202 is "B", then the user has only to change the value held by the base address holding means 6061 from "0" to "B". Thereby, interruption processing can be carried out quickly likewise.

Thus, in accordance with the third embodiment, the processor includes the instruction execution control unit 601, the interruption execution control unit 603, the entry address holding unit 606, and the selector 408, whereby the processor realizes high-speed processing while maintaining compatibility with the general processor like the first embodiment In addition, the entry address holding unit 606 includes the base address holding means 6061 to generate the entry address by the use of the base address which can be set by the user. Hence, if the storage area of the procedure for performing processing for the cause of the interruption might be changed, thus can be handled with ease. That is the system can be extended or changed flexibly.

What is claimed is:

1. A processor for controlling execution of instructions stored in a main storage and for performing interruption processing, said processor comprising:

interruption execution control means for accepting an interruption request, analyzing an accepted interruption request to obtain a cause of an interruption, and generating information indicating a storage position in the main storage where a procedure for performing processing for the cause of the interruption is stored;

specific address holding means for holding first address information obtained from the information generated by said interruption execution control means; and instruction execution control means for deciding whether or not the first address information held by said specific address holding means is to be used as information indicating a storage position of an instruction to be executed and for controlling execution of the instruction according to a result of the decision;

wherein said interruption execution control means outputs information indicating the interruption request to said instruction execution control means; and wherein said instruction execution control means, upon receiving the information indicating the interruption request, generates information indicating a storage position in the main storage of a predetermined procedure and controls execution of the instruction so that the generated information is used as information indicating the storage position of the instruction to be executed.

2. A processor as claimed in claim 1, said processor further comprising:

means for holding storage position information of a subsequent instruction which generates information indicating a storage position in the main storage of an instruction to be subsequently executed and holding the generated information as second address information;

wherein said instruction execution control means controls execution of either the instruction or the subsequent instruction so that either the first address information or the second address information, respectively, is used as the information indicting the storage position of the instruction to be executed.

3. A processor for controlling execution of instructions stored in a main storage and for performing interruption processing, said processor comprising:

interruption execution control means for accepting an interruption request, analyzing an accepted interruption request to obtain a cause of an interruption, and generating information indicating a storage position in the main storage where a procedure for performing processing for the cause of the interruption is stored;

specific address holding means for holding first address information obtained from the information generated by said interruption execution control means;

instruction execution control means for deciding whether or not the first address information held by said specific address holding means is to be used as information indicating a storage position of an instruction to be executed and for controlling execution of the instruction according to a result of the decision; and means for holding storage position information of a subsequent instruction which generates information indicating a storage position in the main storage of an instruction to be subsequently executed and holding the generated information as second address information;

wherein said instruction execution control means controls execution of either the instruction or the subsequent instruction so that either the first address information or the second address information, respectively, is used as the information indicating the storage position of the instruction to be executed.

4. A processor for controlling execution of instructions stored in a main storage and for performing interruption processing, said processor comprising:

interruption execution control means for accepting interruption requests, analyzing accepted interruption requests to obtain causes of interruptions, and generating information indicating storage positions in the main storage where procedures for performing processing for the causes of the interruptions are stored;

wherein said interruption execution control means comprises:

means for holding storage position information of the procedures which holds information indicating correspondences between the causes of the interruptions obtained by analysis and the storage positions in the main storage of the procedures for processing respective causes of the interruptions;

specific address holding means for holding first address information obtained from the information generated by said interruption execution control means; and instruction execution control means for deciding whether or not the first address information held by said specific address holding means is to be used as information indicating a storage position of an instruction to be executed and for controlling execution of the instruction according to a result of the decision.

5. A processor as claimed in claim 4, wherein the information held by said means for holding storage position information of procedures is set by a user.

6. A processor for controlling execution of instructions stored in a main storage and for performing interruption processing, and processor comprising:

interruption execution control means for accepting an interruption request, analyzing an accepted interruption request to obtain a cause of an interruption, and generating information indicating a storage position in the main storage where a procedure for performing processing for the cause of the interruption is stored;

specific address holding means for holding first address information obtained from the information generated by said interruption execution control means;

wherein said specific address holding means comprises:
reference address information holding means for holding reference address information which specifies the storage position in the main storage;

wherein said specific address holding means adds the information generated by said interruption execution control means to the reference address information to generate the first address information; and instruction execution control means for deciding whether or not the first address information held by said specific address holding means is to be used as information indicating a storage position of an instruction to be executed and for controlling execution of the instruction according to a result of the decision.

7. A processor as claimed in claim 6, wherein the reference address information held by said reference address information holding means is set by a user.

8. A processor for controlling execution of instructions stored in a main storage and for performing interruption processing, said processor comprising:

interruption execution control means for accepting an interruption request, analyzing an accepted interruption request to obtain a cause of an interruption, and generating information indicating a storage position in the main storage where a procedure for performing processing for the cause of the interruption is stored;

specific address holding means for holding first address information obtained from the information generated by said interruption execution control means;

wherein said specific address holding means comprises:
reference address information holding means for holding reference address information which specifies the storage position in the main storage, wherein the reference address information is set by a user; and instruction execution control means for deciding whether or not the first address information held by said specific address holding means is to be used as information indicating a storage position of an instruction to be executed and for controlling execution of the instruction according to a result of the decision.

9. A processor for controlling execution of instructions stored in a main storage and for performing interruption processing, said processor comprising:

interruption execution control unit operable to accept an interruption request, analyze an accepted interruption request to obtain a cause of an interruption, and generate information indicating a storage position in the main storage where a procedure for performing processing for the cause of the interruption is stored;

specific address holding unit operable to hold first address information obtained from the information generated by said interruption execution control unit; and instruction execution control and operable to decide whether or not the first address information held by said specific address holding unit is to be used as information indicting a storage position of an instruction to be executed and to control execution of the instruction according to a result of the decision;

wherein said interruption execution control unit is operable to output information indicating the interruption request to said instruction execution control unit; and wherein said instruction execution control unit, upon receiving the information indicting the interruption request is operable to generate information indicating a storage position in the main storage of a predetermined procedure and operable to control execution of the instruction so that the generated information is used as information indicating the storage position of the instruction to be executed.

10. A processor as claimed in claim 9, said processor further comprising:
unit operable to hold storage position information of a subsequent instruction which generates information indicating a storage position in the main storage of an instruction to be subsquently executed an operable to hold the generated information as second address information;
wherein said instruction execution control unit is operable to control execution of either the instruction or the subsequent instruction so that either the first address information or the second address information, respectively, is used as the information indicating the storage position of the instruction to be executed.

11. A processor for controlling execution of instructions stored in a main storage and for performing interruption processing, said processor comprising:
interruption execution control unit operable to accept an interruption request, analyze an accepted interruption request to obtain a cause of an interruption, and generate information indicating a storage position in the main storage where a procedure for performing processing for the cause of the interruption is stored;
specific address holding unit operable to hold first address information obtained from the information generated by said interruption execution control unit;
instruction execution control unit operable to decide whether or not the first address information held by said specific address holding unit is to be used as information indicating a storage position of an instruction to be executed and operable to control execution of the instruction according to a result of the decision; and
unit operable to hold storage position information of a subsequent instruction which generates information indicating a storage position in the main storage of an instruction to be subsequently executed and operable to hold the generated information as second address information;
wherein said instruction execution control unit is operable to control execution of either the instruction or the subsequent instruction so that either the first address information or the second address information, respectively, is used as the information indicating the storage position of the instruction to be executed.

12. A processor for controlling execution of instructions stored in a main storage and for performing interruption processing, said processor comprising:
interruption execution control unit operable to accept interruption requests, analyze accepted interruption requests to obtain causes of interruptions, and generate information indicting storage positions in the main storage where procedures for performing processing for the causes of the interruptions are stored;
wherein said interruption execution control unit comprises:
unit operable to hold storage position information of the procedures which holds information indicating correspondences between the causes of the interruption obtained by analysis and the storage positions in the main storage of the procedures for processing the respective causes of the interruptions;
specific address holding unit operable to hold first address information obtained from the information generated by said interruption execution control unit; and
instruction execution control unit operable to decide whether or not the first address information held by said specific address holding unit is to be used as information indicating a storage position of an instruction to be executed and operable to control execution of the instruction according to a result of the decision.

13. A processor as claimed in claim 12, wherein the information held by said unit operable to hold storage position information of procedures is set by a user.

14. A processor for controlling execution of instructions stored in a main storage and for performing interruption processing, and processor comprising:
interruption execution control unit operable to accept an interruption request, analyze an accepted interruption request to obtain a cause of an interruption, and generate information indicating a storage position in the main storage where a procedure for performing processing for the cause of the interruption is stored;
specific address holding unit operable to hold first address information obtained from the information generated by said interruption execution control unit;
wherein said specific address holding unit comprises;
reference address information holding unit operable to hold reference address information which specifies the storage position in the main storage;
wherein said specific address holding unit is operable to add the information generated by said interruption execution control unit to the reference address information to generate the first address information; and
instruction execution control unit operable to decide whether or not the first address information held by said specific address holding unit is to be used as information indicating a storage position of an instruction to be executed and operable to control execution of the instruction according to a result of the decision.

15. A processor as claimed in claim 14, wherein the reference address information held by said reference address information holding unit is set by a user.

16. A processor for controlling execution of instructions stored in a main storage and for performing interruption processing, said processor comprising:
interruption execution control unit operable to accept an interruption request, analyze an accepted interruption request to obtain a cause of an interruption, and generate information indicating a storage position in the main storage where a procedure for performing processing for the cause of the interruption is stored;
specific address holding unit operable to hold first address information obtained from the information generated by said interruption execution control unit;
wherein said specific address holding unit comprises:
reference address information holding unit operable to hold reference address information which specifies the storage position in the main storage, wherein the reference address information is set by a user; and
instruction execution control unit operable to decide whether or not the first address information held by said specific address holding unit is to be used information indicating a storage position of an instruction to be executed and operable to control execution of the instruction according to a result of the decision.

* * * * *